Figure 3:
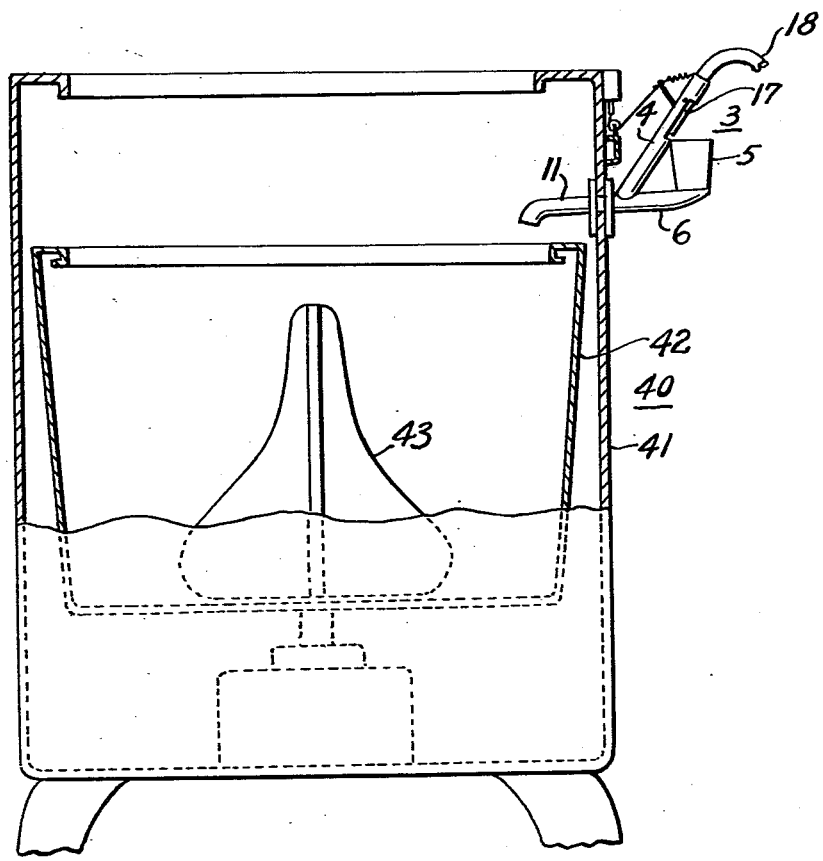

Oct. 29, 1957
K. ALBRECHT
2,811,033
CHEMICAL FEEDERS
Filed June 6, 1956
2 Sheets-Sheet 1
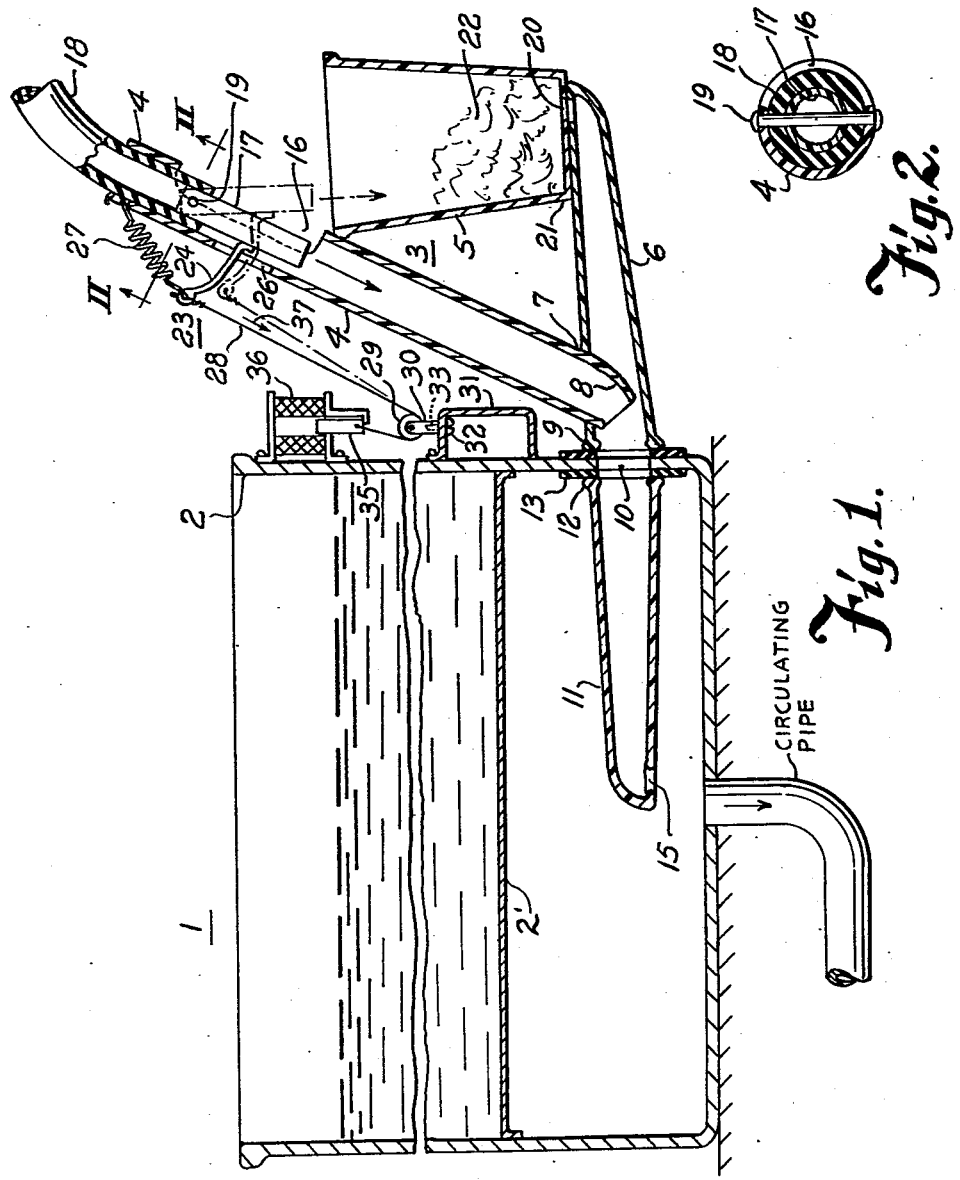
INVENTOR.
KURT ALBRECHT
BY Gerald B. Tjoflat
ATTY.

INVENTOR.
KURT ALBRECHT

United States Patent Office 2,811,033
Patented Oct. 29, 1957

2,811,033
CHEMICAL FEEDERS

Kurt Albrecht, Painesville, Ohio, assignor to Hagan Chemicals & Controls, Inc., a corporation of Pennsylvania Application June 6, 1956, Serial No. 589,722

5 Claims. (Cl. 68—17)

This invention relates to apparatus for selectively supplying water or water and a chemical into the tank of a washing apparatus.

An object of this invention is to provide a relatively simple apparatus whereby a chemical, such as a detergent or a water softening agent, may be stored in a container for that purpose out of contact with the solution in the washing apparatus, and supplied to the main conduit through which water is supplied to the washing apparatus.

A further object is to provide a water supply and a chemical feed apparatus having a diverter whereby water may be delivered directly to the washing apparatus or diverted through the chemical feeder into the apparatus either automatically or manually.

Another object of the invention is to provide an apparatus for selectively supplying water or water solution of a chemical to the tank of a washing apparatus that comprises a main water supply conduit having in a wall thereof an opening, a flexible conduit within the main conduit which is secured at its upper end at a location above the opening, its lower free end being deflectable back and forth through the opening, a chemical storage container disposed adjacent the opening in the main conduit and having a chemical feed conduit connecting its lower portion with the main conduit, and means for deflecting the flexible conduit from a position in which water flows directly through the main conduit into the washing apparatus or to a position when the water is directed into the chemical supply container and the chemical feeder conduit from which it flows into the washing apparatus.

A further object of the invention is to provide a water supply and chemical feeding apparatus as set forth above that shall be simple in construction, inexpensive to manufacture and install and which may be applied to existing washing apparatus or as a component part of new washing apparatus.

The above and other objects of the invention will be apparent to those of ordinary skill in the art to which the invention pertains from the following description taken in conjunction with the accompanying drawings.

In the drawings:

Figure 1 is a more or less diagrammatic view of a washing apparatus provided with a water and chemical supply apparatus embodying a form of the invention; and Fig. 2 is a view in section taken on line II—II of Fig. 1; and Fig. 3 is a more or less diagrammatic view of a clothes washer provided with a chemical feeder shown in Fig. 1.

In the drawings a washing apparatus 1 having a tank or tub 2 is shown to which water and chemicals such as detergents or water softening or conditioning agents are supplied. The tub 2 may have a bottom 2' therein as shown.

The illustrated embodiment is provided with an apparatus 3 by means of which water as such may be delivered to tank 2, or water and chemical, such as a detergent or a water softening agent, may be supplied to the tank at will. The apparatus 3 may be actuated manually or automatically depending upon the type of machine to which it is applied.

The apparatus 3 comprises a flexible main conduit 4, a chemical charge holding container 5 and a chemical feed conduit 6, the latter connecting the lower portion of the container 5 with the lower portion of the main conduit 4. The chemical feed conduit 6 is provided with an opening 7 through which the lower end of the main conduit 4 extends. One portion of the main conduit 4 is provided with a curved portion 8 that acts to direct water flowing through the main conduit, into the machine.

In a preferred construction the main conduit 4, the chemical container 5 and the chemical feed conduit 6 are formed of a plastic material which resists chemical reaction with the chemical supplied from the container 5. The inner end of the chemical feed conduit 6 is flanged as at 9 so that it may be bolted to the machine 2. The main conduit 4 and the chemical feed conduit 6 discharge through an opening 10 in the wall of the tub or tank 2 into a conduit 11 on the inside of the tub. The conduit 11 is flanged at 12 so that it may be secured to the wall of the tank. In order to provide a fluid-tight joint at opening 10, gaskets 13 are provided on the inside and outside of the tank wall and between the flanges 9 and 12 and the wall as shown. The discharge end of conduit 11 is preferably curved downwardly and provided with a relatively large opening 15 so as to reduce the resistance to flow of water or water and detergent into the tank.

The main conduit is provided with a diverter whereby water may be selectively delivered directly to conduit 11 to the machine or through the chemical container 5 to the conduit 11 to the machine. As illustrated, the diverter comprises a flexible conduit 17 mounted in the main conduit 4 which is provided with a cut-away portion or opening 16 at a location above the container 5. The upper end of the diverter or flexible conduit 17 is secured within a conduit such as a supply hose 18 of rubber or the like. The upper end of the member 17 is secured to the hose 18 by means of a pin 19. The lower end of the conduit 17 is free so that it may be deflected from the position shown in the drawings to the dotted line position. When in the dotted line position water discharges into the container 5 where it picks up chemical and flows out through an opening 20 communicating with the chemical feed conduit 6.

As shown, the container 5 is supported at an angle so that the opening 20 is higher than the corner 21 of the container. For this reason chemical may be piled up more on one side of the container 5 than on the other as indicated by the pile 22.

When the water flows into the container 5 it dissolves some of the chemical and at the same time carries some of it in undissolved or partially dissolved condition into the washing apparatus.

In order to provide for actuating the conduit 17 from the position shown in full lines in the drawings to the dotted line position and back again to the full line position, means 23 are provided. The means 23 comprises a link 24, preferably curved as shown, so that it may move in or out of an opening 26 in the main conduit opposite the opening 16, a spring 27 and a cable 28. One end of the spring is secured to the main conduit 4 at a location above the opening 26 and the other end of the spring is connected to the outer end of the link or arm 24.

The cord or cable 28 passes under a pulley 29 supported by a pulley block 30. The pulley block is secured to a raceway 31 secured to a wall of the machine 2. As shown, the pulley block 30 is secured by means of a screw 32 which is threaded and passed through the wall of the raceway 31 into a threaded socket 33 in the pulley block. The other end of the cable 28 is connected to an armature 35 of a solenoid 36.

When the solenoid 36 is energized the armature is pulled upwardly thereby pulling the cable 28 in the direction of the arrow 37 which causes the arm 24 to swing inwardly of the main conduit 4 to position the discharge end thereof over the mouth of the container 5. When the solenoid is deenergized, the spring 27 and the natural spring of the conduit 17 causes it to assume the position shown in the full lines in the drawings. In that position the conduit 17 and the main conduit 4 are substantially coaxial.

In order to minimize the tendency of water or detergent solution to flow up the conduit 6 towards the opening 20 in the bottom of the container 5, the discharge end of the chemical feed conduit 6 is rounded inwardly as shown.

The solenoid 36 may be energized under manual control or by automatic control. For example, the solenoid may be arranged to be operated by the timing apparatus of a washing apparatus so that it is energized only at such times as chemical is to be supplied to the water in the tank of the machine. For example if the machine is intended for washing clothes and it is desirable to supply water softening agent to the rinse water, container 5 is charged with a water softening agent such as glassy sodium phosphates or alkali metal tripolyphosphate. At the set time, water is directed into container 5 from which it flows into the machine carrying with it the chemical in the correct amount. The amount fed is determined the amount placed in the container 5 and the length of time that the water discharges from the flexible conduit 17 into the container.

In Fig. 3 a clothes washer 40 is shown comprising an outer shell 41, a tub 42 within the shell and the usual motor driven agitator 43 within the tub. The feeder 3 is mounted on the shell 41 at a location above the rim of the tub. The chemical, if a water softener, is fed to the tub when the tub is being filled with water for the rinse.

Having thus described the invention, it will be apparent to those of ordinary skill in the art to which the invention pertains that the illustrated embodiment may be modified and changed without departing from either the spirit or the scope of the invention.

Therefore, what is claimed as new and desired to be secured by Letters Patent is:

1. A device for feeding a chemical to a detergent solution in a washing apparatus, comprising a main conduit for the apparatus and adapted for connection at one end to a water supply hose and at the other end to discharge into the washing apparatus, said conduit having a cut-away portion providing an opening in a wall thereof, a flexible conduit secured at its upper end in said main conduit above said opening in flow communication with the water supply, and having its free end disposed adjacent the lower end of said cut-away opening, a container for chemical disposed adjacent said cut-away opening with the top thereof below the free end of the flexible conduit, a chemical feed conduit connecting the lower portion of said container and said main conduit at a location near its discharge end, and means for deflecting said flexible conduit to a position where the water flows into said container to carry chemicals into the washing apparatus, said deflecting means being biased to return the flexible conduit to the position where water flows through said main conduit.

2. The combination with a washing apparatus having a tank for holding a chemical solution, and a main water supply conduit having communication with the interior of the tank for supplying water to the tank, of a chemical feeder comprising a container for chemical, a chemical feed conduit connecting the lower portion of said container with said main conduit at a location near the point where the main conduit enters the tank, a flexible conduit in the main water supply conduit, the upper end of said flexible conduit being secured to the main conduit and the lower end thereof being free to deflect, said main conduit having an opening in a side wall thereof through which the flexible conduit may be oscillated to discharge water either through the main conduit or into the chemical container.

3. The combination as in claim 2 in which means are provided for normally urging the flexible conduit to a position where the water discharges through the main conduit.

4. The combination as in claim 2 in which means are provided for deflecting the free end of the flexible conduit through said wall opening.

5. The combination as in claim 2 in which a water supply hose is connected to the main conduit, and in which the main conduit, the chemical container and the chemical feed conduit are composed of a plastic material that resists reaction with the chemical.

References Cited in the file of this patent
UNITED STATES PATENTS

| 2,006,085 | Lehmkuhl | June 25, 1935 |
| 2,228,914 | Pierce | Jan. 14, 1941 |
| 2,712,746 | Bochan | July 12, 1955 |